US008249931B2

(12) United States Patent
Giraud et al.

(10) Patent No.: US 8,249,931 B2
(45) Date of Patent: *Aug. 21, 2012

(54) SYSTEM FOR SELECTIVELY COMMUNICATING PROMOTIONAL INFORMATION TO A PERSON

(75) Inventors: Stephen G. Giraud, Petaluma, CA (US); Paul J. Lingane, Redwood City, CA (US)

(73) Assignee: Promovu, Inc., San Francisco, CA (US)

( * ) Notice: Subject to any disclaimer, the term of this patent is extended or adjusted under 35 U.S.C. 154(b) by 98 days.

This patent is subject to a terminal disclaimer.

(21) Appl. No.: 12/847,827

(22) Filed: Jul. 30, 2010

(65) Prior Publication Data
US 2010/0299210 A1   Nov. 25, 2010

Related U.S. Application Data

(63) Continuation of application No. 10/924,168, filed on Aug. 23, 2004, now Pat. No. 7,769,632, which is a continuation of application No. 10/142,006, filed on May 8, 2002, now abandoned, which is a continuation of application No. 09/465,659, filed on Dec. 17, 1999, now abandoned.

(51) Int. Cl.
G06Q 30/00   (2012.01)

(52) U.S. Cl. .................. 705/14.4; 705/14.45; 705/14.5; 705/14.49; 455/40; 455/414.2

(58) Field of Classification Search .................. 705/14.4, 705/14.45, 14.5, 14.49; 455/40, 414.2
See application file for complete search history.

(56) References Cited

U.S. PATENT DOCUMENTS

| 4,075,657 | A | 2/1978 | Weinblatt |
| 4,755,045 | A | 7/1988 | Borah et al. |
| 4,769,697 | A | 9/1988 | Gilley et al. |
| 4,789,235 | A | 12/1988 | Borah et al. |
| 4,795,889 | A | 1/1989 | Matuura et al. |
| 4,859,050 | A | 8/1989 | Borah et al. |
| 4,931,865 | A | 6/1990 | Scarampi |
| 5,187,688 | A | 2/1993 | Saruta |
| 5,227,874 | A | 7/1993 | Von Kohorn |
| 5,305,197 | A | 4/1994 | Axler et al. |
| 5,504,675 | A | 4/1996 | Cragun et al. |
| 5,657,004 | A | 8/1997 | Whittaker et al. |

(Continued)

FOREIGN PATENT DOCUMENTS
EP   0278024 A1   2/1987
(Continued)

OTHER PUBLICATIONS (Graphic) "Sweet sell . . . ", Guardian Publication, Ltd., Manchester Guardian Weekly (UK News), Sep. 1, 1996, p. 10.

(Continued)

Primary Examiner — Raquel Alvarez
(74) Attorney, Agent, or Firm — Michael A. Glenn; Glenn Patent Group

(57) ABSTRACT

A system for selectively communicating promotional information to a person, includes a sensing system, a storage device, a controller, and a projection device. The sensing system measures a detectable feature associated with the person sensed by the sensing system and the storage device stores a plurality of promotional segments. The controller uses the measured detectable feature associated with the person for selecting one of the stored promotional segments and causing the projection device to project to the person at the predetermined location the selected promotional segment.

18 Claims, 3 Drawing Sheets

U.S. PATENT DOCUMENTS

| | | | |
|---|---|---|---|
| 5,694,323 | A | 12/1997 | Koropitzer et al. |
| 5,966,696 | A | 10/1999 | Giraud |
| 6,144,848 | A | 11/2000 | Walsh et al. |
| 6,160,986 | A | 12/2000 | Gabai et al. |
| 6,269,173 | B1 | 7/2001 | Hsien |
| 6,279,036 | B1 | 8/2001 | Himmel et al. |
| 6,317,782 | B1 | 11/2001 | Himmel et al. |
| 6,338,043 | B1 | 1/2002 | Miller |
| 6,381,626 | B1 | 4/2002 | De Leo et al. |
| 6,400,996 | B1 | 6/2002 | Hoffberg et al. |
| 6,418,424 | B1 | 7/2002 | Hoffberg et al. |
| 6,484,148 | B1 | 11/2002 | Boyd |
| 6,502,076 | B1 | 12/2002 | Smith |
| 6,508,398 | B1 | 1/2003 | Estes |
| 6,567,842 | B2 | 5/2003 | De Leo et al. |
| 6,577,329 | B1 | 6/2003 | Flickner et al. |
| 6,625,581 | B1 | 9/2003 | Perkowski |
| 6,633,346 | B1 | 10/2003 | Yamamoto |
| 6,640,145 | B2 | 10/2003 | Hoffberg |
| 6,647,269 | B2 | 11/2003 | Hendrey et al. |
| 6,685,086 | B1 | 2/2004 | Mackenzie et al. |
| 6,715,673 | B2 | 4/2004 | Fulcher et al. |
| 6,763,148 | B1 | 7/2004 | Sternberg et al. |
| 6,819,919 | B1 | 11/2004 | Tanaka |
| 6,869,013 | B2 | 3/2005 | Allen et al. |
| 6,904,408 | B1 | 6/2005 | McCarthy et al. |
| 6,929,179 | B2 | 8/2005 | Fulcher et al. |
| 6,956,541 | B2 | 10/2005 | McClintock |
| 6,956,545 | B2 | 10/2005 | McClintock et al. |
| 6,961,712 | B1 | 11/2005 | Perkowski |
| 6,970,131 | B2 | 11/2005 | Percy |
| 7,006,982 | B2 | 2/2006 | Sorenson |
| 7,010,308 | B2 | 3/2006 | Hendrey |
| 7,015,875 | B2 | 3/2006 | Wampler et al. |
| 7,088,352 | B2 | 8/2006 | Wampler |
| 7,091,933 | B2 | 8/2006 | McClintock et al. |
| 7,098,869 | B2 | 8/2006 | Vaitekunas et al. |
| 7,098,870 | B2 | 8/2006 | Wampler |
| 7,174,029 | B2 | 2/2007 | Agostinelli et al. |
| 7,242,988 | B1 | 7/2007 | Hoffberg et al. |
| 7,343,318 | B2 | 3/2008 | Suwabe |
| 7,358,861 | B2 | 4/2008 | Blum et al. |
| 7,374,096 | B2 | 5/2008 | Overhultz et al. |
| 7,395,241 | B1 | 7/2008 | Cook et al. |
| 2003/0046080 | A1 | 3/2003 | Hejna, Jr. |
| 2003/0063779 | A1 | 4/2003 | Wrigley |
| 2004/0133927 | A1 | 7/2004 | Sternberg et al. |
| 2005/0131607 | A1 | 6/2005 | Breed |
| 2005/0167482 | A1 | 8/2005 | Ramachandran et al. |
| 2005/0288954 | A1 | 12/2005 | McCarthy et al. |
| 2006/0190419 | A1 | 8/2006 | Bunn et al. |
| 2006/0190809 | A1 | 8/2006 | Hejna, Jr. |
| 2006/0256133 | A1 | 11/2006 | Rosenberg |
| 2006/0293921 | A1 | 12/2006 | McCarthy et al. |
| 2007/0070038 | A1 | 3/2007 | Hoffberg et al. |
| 2007/0262574 | A1 | 11/2007 | Breed et al. |
| 2007/0271518 | A1 | 11/2007 | Tischer et al. |
| 2007/0271580 | A1 | 11/2007 | Tischer et al. |
| 2007/0280505 | A1 | 12/2007 | Breed |
| 2007/0282506 | A1 | 12/2007 | Breed et al. |
| 2008/0036580 | A1 | 2/2008 | Breed |

FOREIGN PATENT DOCUMENTS

| | | |
|---|---|---|
| EP | 0814419 A2 | 12/1997 |
| JP | 02-273891 | 11/1990 |
| JP | 05-035942 | 12/1993 |
| JP | 07-193897 | 7/1995 |
| WO | WO-93/16443 | 9/1993 |
| WO | WO-02/079942 | 10/2002 |
| WO | WO-2007/002941 | 1/2007 |
| WO | WO-2007/035115 | 3/2007 |
| WO | WO-2008/051332 | 5/2008 |

OTHER PUBLICATIONS

"Do Consumers Want/Need the Promotion You Create?", Entertainment Marketing Letter, (See U.S. Appl. No. 10/142,006), Sep. 1, 1997.

"Face Recognition Software", Popular Science, Retrieved on Jul. 22, 2008 from website: http://www.popsci.com/catagory/tages/face-recognition-software, 2008, Total of 1 page.

"iCapture Mini: Audience Measurement for Small Digital Displays", TruMedia—Audience Measurement Systems, Retrieved from website on Jul. 22, 2008: http://www.trumedia.co.il/inside.asp?ID=44, 2006, Total of 3 pages.

"iCapture: Audience Measurement System for Out-of-Home Digital Displays", TruMedia—Audience Measurement Systems, Retrieved on Jul. 22, 2008 from website: http://www.tru-media.com/inside.asp?ID=11, 2006, Total of 3 pages.

"iGaze: Consumer Behavior Measurement System", TruMedia—Audience Measurement Systems, Retrieved on Jul. 22, 2008 from website: http://www.trumedia.co.il/inside.asp?ID=29, 2006, Total of 3 pages.

"iTally: Opportunity to see (OTS) People Counter", TruMedia—Audience Measurement Systems, Retrieved on Jul. 22, 2008 from website: http://www.trumedia.co.il/inside.asp?ID=27, 2006, Total of 2 pages.

"Sony puts face recognition in webcam range", E-consultancy.com, http://www.e-consultancy.com/news-blog/7534/sony-puts-face-recognition-in-webcam-range.html, Sep. 19, 2001, 1-2.

Akbari, M.A. et al., "Discerning advisor: an intelligent advertising system for clothes considering skin color", 2005 International Conference on Cyberworlds, IEEE Computer Society, Los Alamitos, CA, USA, 2006, 8.

Birchfield, Stan , "An Elliptical Head Tracker", 31st Asilomar Conference on Signals, Systems, and Computers, IEEE, Nov. 1997, Total of 5 pages.

Black, Michael J. et al., "Tracking and Recognizing Rigid and Non-Rigid Facial Motions", Proc. Fifth Int. Conf. on Computer Vision, Boston, Jun. 1995, 1-8.

De Campos, Teófilo E. et al., "Eigenfaces versus Eigeneyes: First Steps Toward Performance Assessment of Representations for Face Recognition", Lecture Notes in Artificial Intelligence, vol. 1793; MICAI-2000: Acapulco; Springer-Verlag press http://www.springer.de/comp/lncs/index.html, Apr. 2000, 197-206.

De Campos, Teófilo E. et al., "Improved Face/Non-Face Discrimination Using Fourier Descriptors", Brazilian Symposium on Computer Graphics and Image Processing, Gramado, Brazil; IEEE Computer Society Press, Oct. 2000, Total of 8 pages.

Duvdevani-Bar, Sharon et al., "A similarity-based method for the generalization of face recognition over pose and expression", CSRP 480, Univ of Sussex at Brighton; ISSN 1350-3162, Jan. 1998, Total of 8 pages.

Feris, Rogerio S. et al., "Tracking Facial Features Using Gabor Wavelet Networks", Brazilian Symposium on Computer Graphics and Image Processing, IEEE Computer Society Press, Oct. 2000, Total of 7 pages.

Fromherz, T et al., "Facial tracking and animation using a 3D sensor", Proceedings Fourth IEEE International Conference on Automatic Face and Gesture Recognition, IEEE Comput. Soc , Los Alamitos, CA, USA, 2000, 162.

Gavrila, D.M. , "The Visual Analysis of Human Movement: A Survey", Computer Vision and Image Understanding, vol. 73, No. 1; Academic Press, 1999, 82-89.

Gong, Shaogang et al., "An Investigation into Face Pose Distributions", Proceedings of the 2nd International Conference on Automatic Face and Gesture Recognition, IEEE; Killington, Vermont, Oct. 1996, 1-7.

Gorodnichy, D.O. et al., "Nouse 'Use Your Nose as a Mouse'—a New Technology for Hands-free Games and Interfaces", Image and Vision Computing, vol. 22, Issue 12; http://www.cv.iit.nrc.ca/research/Nouse, Oct. 1, 2004, 931-942.

Goubet, Emmanuel et al., "Pedestrian Tracking Using Thermal Infrared Imaging", SPIE Conf. Infrared Technology and Applications, XXXII, vol. 6206, May 2006, 797-808.

Howell, A.J. et al., "Towards Unconstrained Face Recognition from Image Sequences", CSRP 430, Univ. of Sussex at Brighton; ISSN 1350-3162, Aug. 1996, Total of 9 pages.

Hunke, M , "Locating and Tracking of Human Faces with Neural Networks", CMU-CS-94-155, School of Computer Science, Carnegie Mellon Univ., Aug. 1994, Total of 82 pages.

Hunke, Martin et al., "Face Locating and Tracking for Human-Computer Interaction", IEEE Proc of the 28th ACSSC, vol. 2, 1994, 1277-1281.

Ishii, Y et al., "Detection of attention behavior for marketing information system", 2002 7th International Conference on Control, Automation, Robotics and Vision, vol. 2; Nanyang Technological Univ, Singapore, 2002, 710-715.

La Cascia, Marco et al., "Fast, Reliable Head Tracking under Varying Illumination", IEEE Conf. on Computer Vision and Pattern Recognition, Jun. 1999, Total of 7 pages.

La Cascia, Marco et al., "Fast, Reliable Head Tracking under Varying Illumination", Boston University Computer Science Technical Report, No. 98-018, Dec. 1998, Total of 9 pages.

Li, Stan et al., "Face Recognition Using the Nearest Feature Line Method", IEEE Transactions on Neural Networks, vol. 10, No. 2, Mar. 1999, 439-443.

McKenna, Stephen et al., "Tracking Faces", IEEE Proceedings of the 2nd International Conference on Automatic Face and Gesture Recognition, Killington, Vermont, 10/141996, Total of 7 pages.

McKenna, Stphen et al., "Face Tracking and Pose Representation", Machine Vision Lab, Dept. of Computer Science, Queen Mary and Westfield College, Mile End Rd. London, Feb. 20, 1997, Total of 10 pages.

Oliver, Nuria et al., "LAFTER: a real-time face and lips tracker with facial expression recognition", Pattern Recognition, vol. 33, 2000, 1369-1382.

Pantic, Maja et al., "Automatic Analysis of Facial Expressions: The State of the Art", IEEE Transactions of Pattern Analysis and Machine Intelligence, vol. 22, No. 12, Dec. 2000, 1424-1445.

Pentland, Alex et al., "Face Recognition for Smart Environments", IEEE Computer, Feb. 2000, Total of 7 pages.

Rasmussen, Daria R. , "Social Hallucinations: Riffs on advertising, marketing, media and society", Retrieved from website: http://mediablog.typepad.com/media_blog/2007/01/billboards_with.html, Jan. 21, 2007, Total of 1 page.

Russakoff, Daniel B. et al., "Head tracking using stereo", Machine Vision and Applications, vol. 13; Springer-Verlag, 2002, 164-173.

Samaria, Ferdinando , "Face Segmentation for Identification Using Hidden Markov Models", Proc. of 4th British Machine Vision Conference, Spinger-Verlag, 1993, Total of 10 pages.

Shah, Mubarak , "Mentoring Undergraduates in Computer Vision Research", IEEE Transactions on Education, vol. 44, No. 3, Aug. 2001, 252-257.

Triesch, Jochen et al., "A System for Person-Independent Hand Posture Recognition Against Complex Backgrounds", IEEE Transactions on Pattern Analysis and Machine Intellegence, vol. 23, No. 12, Dec. 2001, Total of 6 pages.

Witthaus, Michele , "The Missing Link", MarketingWeek, retrieved online from url: http://www.marketingweek.co.uk/home/the-missing-link/2051996.article, Jul. 1, 1999, 3 pages.

Wren, Christopher et al., "Pfinder: Real-Time Tracking of the Human Body", M.I.T. Media Laboratory Preceptual Computing Section Technical Report No. 353, IEEE Transactions on Pattern Analysis and Machine Intelligence; vol. 19, No. 7, Jul. 1997, 780-785.

SYSTEM FOR SELECTIVELY COMMUNICATING PROMOTIONAL INFORMATION TO A PERSON

CROSS-REFERENCE TO RELATED APPLICATIONS

This application is a continuation of U.S. patent application Ser. No. 10/924,168, filed Aug. 23, 2004 which is a continuation of U.S. patent application Ser. No. 10/142,006, filed May 8, 2002, which is a continuation of U.S. patent application Ser. No. 09/465,659, filed Dec. 17, 1999, each of which is incorporated herein in its entirety by this reference thereto.

BACKGROUND OF THE INVENTION

1. Technical Field

The present invention relates to interactive systems for identifying, measuring and tracking consumer exposure to promotional material.

2. Description of the Background Art

Although electronic billboards and other forms of active advertising devices are known, an issue that presently exists in the advertising industry is the lack of accountability. Known advertising devices operate by projecting advertising information at large, regardless of the presence or absence of recipients of this information. However, simply projecting advertising information is no guarantee of the effectiveness of this information in reaching potential consumers and impacting the market for the product being promoted. Although the advertising industry is aware of this, current methods for identifying, measuring and tracking the number of consumers viewing an advertisement, which is important from many standpoints, including marketing research, accounting purposes and rating services for the providers of the advertising service and their advertising clients, are arbitrary at best. Thus, there exist a need for a system that identifies, measures and tracks consumer exposure to a number of different advertisements and that exposes consumers to several different advertisements.

SUMMARY OF THE INVENTION

An interactive system in accordance with the invention identifies, measures and tracks consumer exposure to a number of different advertisements or promotional segments and exposes consumers to several different advertisements. The system simultaneously identifies and measures viewer response and the number of consumers viewing different advertisements, while displaying different selected advertisements for viewing by the consumer.

The system includes a projection means for projecting visual and/or audio advertisements and other information. Preferably the projection means comprises a display device such as a commercially available liquid crystal display (LCD) screen, of suitable dimensions that is housed behind a protective shield for preventing harm to the screen due to vandalism or moisture such as rain, for example.

In the idle mode, the system preferably displays programmed non-advertisement information that may include a picture of a missing person with an associated telephone number for contacting law enforcement officials, current weather reports, traffic reports, trivia questions, and other similar information. Once the presence of at least one potential viewer within the proximity range is sense, the active mode of the system is invoked and the display begins displaying a programmed sequence of advertisements that may include full-motion color commercials, stop-frame commercials, and other advertisements. Information such as trivia questions and famous quotations, for example, can be interspersed between the advertisements if desired.

Additionally, the projection means may comprise a sound generating means. The sound generating means preferably generates an audio portion of the advertisements as they are being displayed by the display means. Optionally, the sound generating means may generate advertisements that are only audio, and may not accompany any video being displayed or may generate audio related to a stop-frame commercial or related to non-advertisement information on the display and for generating any associated audio. Audio content may also be used to attract potential viewers to the display by calling out to them and to interact with them in a manner similar to a conversation between persons. The audio content could be changed or act as a prompt as the person came closer to the display in a manner that would acknowledge their interest.

Additionally, the projection means may comprise a scent generating means. The scent generating means preferably generates a scent associated with the advertisements as they are being displayed by the display means. The scent generating means is to enhance greater memory recall of a given advertisement by projecting an odor, fragrance or aroma associated with the advertisement.

Additionally, the projection means may comprise other devices intended to stimulate human senses such as the sense of touch. Tactile stimulators could be programmed, for example, to stimulate the fingers to mimic the feel of certain objects.

Once it is sensed that viewers are no longer present within the sensed proximity range, the idle mode is gain activated for displaying the mode's associated non-advertisement information.

The system of the invention includes a means for determining the activation time period of the active mode and for determining the portions of the programmed sequence of advertisements that were displayed during the active mode, for determining the particular advertisement that may have been viewed by an identified view as well as viewer response. The system generates consumer tracking data and viewer response representative of the time period that the active mode was invoked and portions of the sequence of advertisements that were displayed during the active mode and transmits the tracking data to a host computer to be analyzed.

The tracking data can be retrieved from the host computer for determining what information in the active mode was displayed and the duration that the system was in the active mode, for determining consumer presence, and identification, consumer response and what portions of the active mode information may have been viewed by potential consumers. Thus, the viewer response and tracking data provides information that indicates the viewer response and the number of consumers that are present within the proximity range and viewing the display, along with the number of occurrences that particular advertisements were presented to potential consumers, since the location of each advertisement on the sequence is known. Therefore, the system of the present invention provides the advertising industry a higher level of accountability than existed in the prior art.

In the preferred embodiment, the system of the present invention further includes a computing means coupled to the display means and to proximity sensing means for detecting the presence of potential consumers within the proximity range relative to the display screen. A memory means is coupled to the computing means and is provided for storing the information displayed during the idle and active modes. The memory means may also be utilized for storing the identification, viewer response and consumer tracking data prior to transmission of the data to the host computer.

The proximity sensing means may comprise any one of several commercially available or custom-designed sensors. These include position and distance sensors, pressure sensors activated by body or vehicle weight, a receiver for voice activation, variety of switches intended to sense use or consumer action involving a telephone handset, door, seat, or bus grab handle, heat sensors, or other sensors that are capable of detecting persons, or appropriate combinations thereof. Suitable heat sensors include commercially available heat sensors and infrared detectors. Proximity sensors may include ultrasound sensors or complex sensors operating with an object recognition algorithm. A plurality of ultra-sound sensors may be used for improving the accuracy and detection range of the system. Complex sensors, such as facial recognition, optical sensors (e.g. retinal or iris scans) or cameras, or combinations thereof, can be used for determining the shape of and identifying a viewer within the proximity range and for determining if a viewer is facing the display means, to determine if the viewer is actually viewing information being shown by the display, to determine what portion of the display is being viewed, or to determine the interest level on the part of the viewer to what is being seen, using such measures as changes in eye pupil size or an analysis of fine eye movement. It is also anticipated as part of the present invention that an electronic camera or audio detecting means (such as a microphone connected to a voice processor) may be sued to identify and obtain information about the viewer and how they are interacting with the display. This camera or microphone might be connected to a computer that would provide processing local to the display or sent over a suitable network for remote processing. The remote processing means may be either an automatic computer system or may consist of human operators, trained or programmed to determine certain characteristics of the viewer. These characteristics include, but are not limited to, approximate age, nationality, race or ethnic background, gender, physical characteristics, or interest level in what advertisement is being shown.

In addition, proximity sensing may be implied by the use of devices physically adjacent to the system of the present invention, such as a gasoline pump, telephone or an automatic teller machine (ATM). In this embodiment the adjacent device would communicate using a data link with the display unit such that proximity would be inferred when someone used the adjacent device.

Another application that uses visual and audible sensing of the viewer would be in determination of the identity of the viewer by means such as analysis of a voiceprint, facial recognition, or retinal scan. This identity information, when combined with information from other databases, could be used to project viewer specific advertising that is custom created for that particular individual. For example when an individual uses a credit card at the gas pump their identity is known, and it is possible to simultaneously capture their picture and voiceprint. The next time they get gas at that station it would be possible to identify them from their picture or voice in advance of using a credit card. Since it is now common practice in the financial services industry to build databases that contain personal spending information on individuals, and since their identity and spending profile would be known once they appeared at the gas pump, it would be possible to create a targeted advertisement that would be custom to that individual. In addition the system can directly correlate viewer identity with subsequent purchases. For example a consumer views a soft drink commercial and is motivated to purchase the soft drink shortly thereafter. Another example would be that a consumer views an appliance commercial and purchases the appliance in the near future with a credit card, and the purchase event can thus be linked to the viewing event through the credit card database.

The invented system further includes a communication means such as a modem or other known data transmission means for connecting one or more systems comprising the present invention to at least one host computer. A plurality of systems comprising the present invention can be coupled to the host computer via known data transmission lines or wireless communication links and using known methods such as the Internet or an intranet. The communication means may also receive information, such as current weather reports and traffic reports for example, from the host computer or other data source coupled to the communication means.

Detection of someone viewing the advertisement is a form of feedback that is of value to the advertiser. Other methods of feedback may be used to measure viewer response. These include means for the viewer to interact with the system, indicating that not only is the viewer watching the display but is interested enough in the content to interact. These forms of feedback may range from a simple button on the display or housing that the viewer may press when prompted by a displayed message or a more sophisticated key panel or a telephone number pad or a credit card reader or a separate communications device that would permit an immediate purchase or an audio receiver that could detect and analyze an audible response from the viewer. Said audio receiver could be connected to a voice recognition system as a means of interpreting what was said by the viewer.

The sequence of advertisements or images presented on the display and the audible messages may be changed or new advertisements or messages may be displayed depending upon feedback from a viewer in an effort to respond or interact to the feedback. It is envisioned that this interaction, if carried out with both visual and audible means, could be refined to have characteristics similar to a natural human interactive dialog.

It is also envisioned within the scope of the present invention that the advertising material presented to the viewer may be changed depending upon the position of the viewer or the proximity to another device or the time of day. For example, a transit bus may be equipped with a system of the present invention. A seat switch would trigger the display to enter active mode when someone sits down. The system would also know its position within a city by use of a Global Positioning System (GPS) receiver or other means known in the art. The display would present ail advertisement for a restaurant that would be coming up at the next stop of the bus. In another example, the system would be at a fixed location such as at a city park, and would also be connected to a data link used to determine the distance to a food vendor's truck. When a viewer walked up to the display it would enter active mode and then display an advertisement for the food vendor with an estimate of how many minutes to wait until the food truck would arrive. The feedback means could then be used to permit the viewer to order from a menu, this information would be relayed to the food truck so that the chef could prepare the food in transit. A final example here is that the advertising message can be changed depending on the time of day, selling coffee in the morning and cocktails in the evening.

It is further envisioned that the advertising material presented may be changed based upon information gathered by the sensors. For example, analysis of the video image of a viewing consumer may yield demographic information to permit targeted advertising to a specific demographic audience.

A further extension envisioned for the invention is for use in computer monitors and televisions to track viewing of material presented on the screen. A sensor device, previously described, could be installed in the cabinet of the monitor such that it can observe the eye and head movements of the viewer or determine if a potential viewer is within the proximity of the screen. Advertising or other material would then be presented on the screen, or on a portion of the screen, and the sensors of the invention would track eye movement to determine if the viewer was looking at the advertising material, how long they were looking, their interest level in the material, the volume setting of the audio channel, the amount of background distraction, and also to collect demographic and possibly identification information about the viewer. This information, including information related to the quality of the viewer response to the advertising, could be processed by the computer associated with the display unit or television, or automatically transferred back to a central database via a communication channel such as the Internet or cable network or telephone line.

The system of the invention is preferably retained in a suitable housing that will prevent damage, due to moisture or vandalism, for instance, to the system. In the preferred embodiment, the housing comprises a strong, waterproof material, such as stainless steel and is fabricated using well known methods.

BRIEF DESCRIPTION OF THE DRAWINGS

Many advantages of the present invention will be apparent to those skilled in the art with a reading of this specification in conjunction with the attached drawings, wherein like reference numerals are applied to like elements wherein.

DETAILED DESCRIPTION OF THE INVENTION

Figure 1:
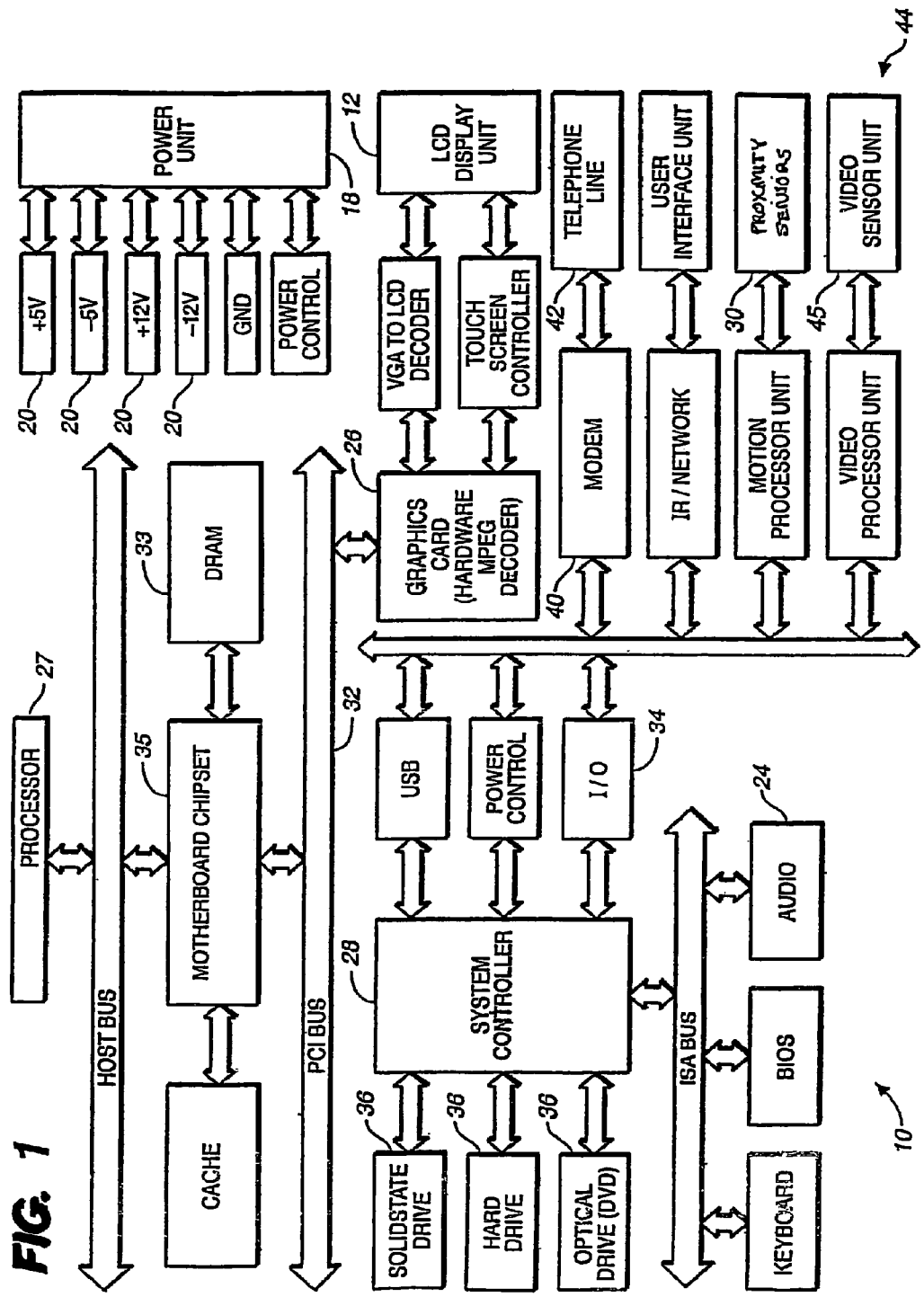
FIG. 1 is a block diagram of a preferred embodiment of a system for identifying, measuring and tracking consumer exposure to a number of different advertisements and for exposing consumers to several different advertisements constructed according to the principles of the present invention.

Referring now to the drawing figures, there is shown generally at 10, a system in accordance with a preferred embodiment of the invention for identifying, measuring and tracking consumer exposure to a number of different advertisements and for exposing consumers to several different advertisements or promotional segments and for gathering information about consumers. The system 10 simultaneously identifies, measures and tracks the number of consumers viewing a number of different advertisements, while displaying different selected advertisements for viewing by the consumer.

The system 10 includes a projection device such as a display 12 for displaying advertisements and other information. Preferably, the display 12 comprises a commercially available Liquid Crystal Display (LCD) screen, or other low power consumption screen, of suitable dimensions that may be housed behind a protective shield 14 (FIG. 2) for preventing harm from coming to the display 12 due to vandalism or moisture such as rain, for example. The LCD screen preferably ranges in size from approximately 11.5 to 52 inches, and may comprise a known TFT Active Matrix LCD screen. The protective shield 14 preferably comprises a strong transparent polycarbonate, such as Lexan, to prevent damage to the display 12 due to impact forces. The protective shield 14 may have a layer of a commercially available scratch resistant material 15, such as that sold under the trademark VANDAL SHIELD. The scratch resistant material 15 prevents damage to the protective shield 14 due to vandalism such as scratches, and may have a layer of commercially available non-glare coating to minimize bright light glare in sunlight for example.

Figure 2:
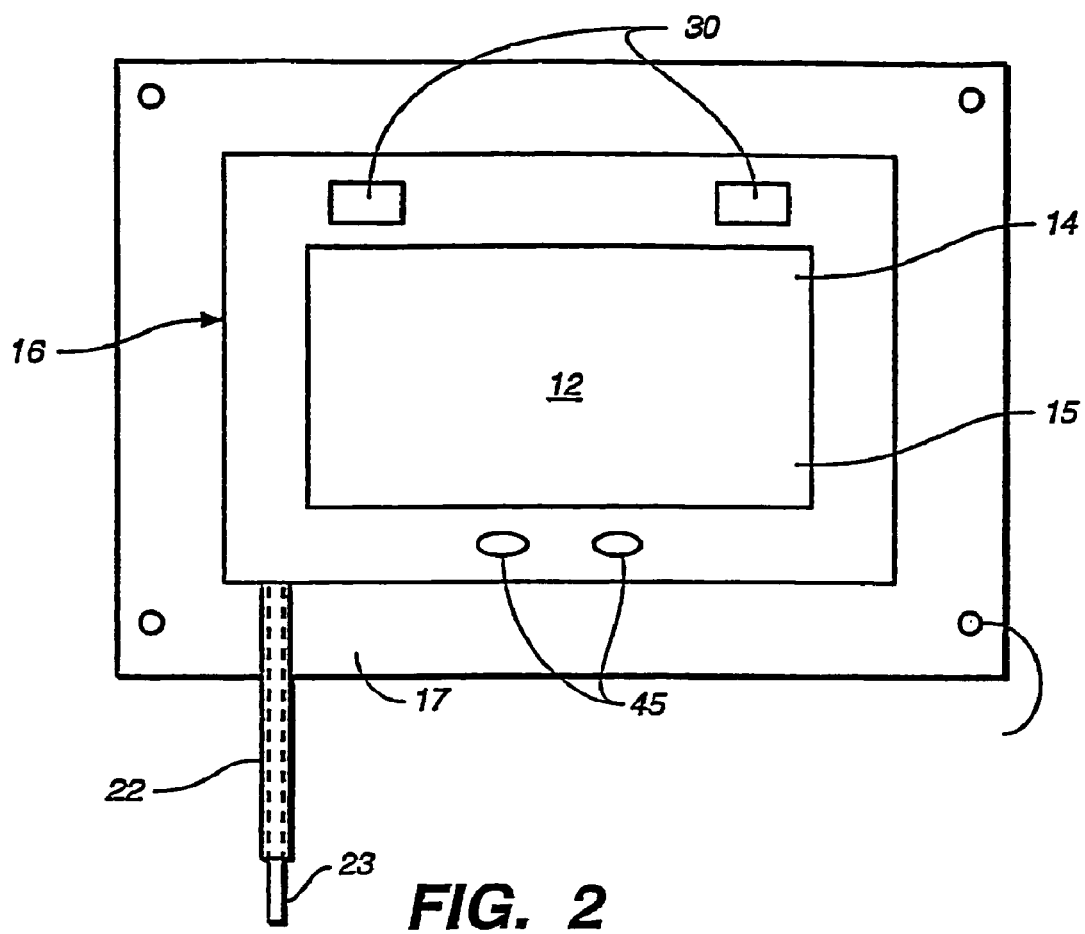
FIG. 2 is a schematic front elevation of a system in accordance with the present invention.
Figure 3:
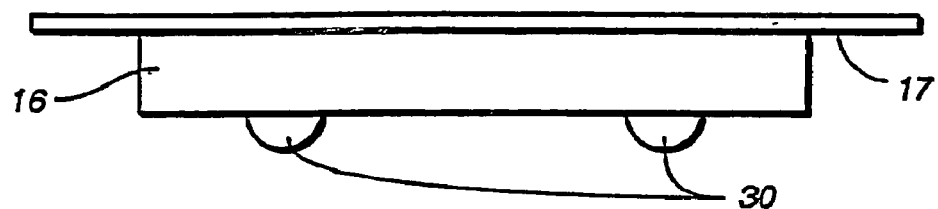
FIG. 3 is a schematic top elevation of a system in accordance with the present invention.

As shown in FIGS. 2 and 3, the system 10, and particularly the electronics thereof (to be discussed hereinafter), is preferably retained in a protective housing 16 that comprises a strong, waterproof material, such as stainless steel or other suitable material. The housing 16 is provided to prevent damage, due to moisture or vandalism for instance, to the system 10. The housing 16 includes a mounting plate 17 for securing the system 10 to a selected surface for viewing at a desired location.

An external 120V AC power source (not shown) is coupled to the system 10 via a power unit 18, for providing electrical power to the system 10. The power unit 18 first converts the 120V AC power to a 24V DC power level. The unit 18 then converts the 24V DC to a number of different preferred electronic device power levels. The unit 18 has power outputs 20 of levels +5V, −5V, +12V, −12V, so that the components of the system 10 do not suffer damage due to excessive power levels. The power unit 18 is coupled to the system 10 via a waterproof, flexible conduit 22 (FIG. 2) which houses power source lines and data transmission lines 23.

The system 10 functions in either one of an idle mode, wherein potential consumers are not within a sensed proximity range or zone, or an active mode, wherein the presence of potential consumers within the proximity range is detected. In the idle mode, the system 10 preferably displays programmed non-advertisement information, that may include a picture of a missing person with an associated telephone number for contacting law enforcement officials, current weather reports, traffic reports, trivia questions, and other similar information through display 12. Once the presence of at least one potential consumer within the proximity range is sensed, the active mode of the system is invoked and the display 12 begins displaying a programmed sequence of advertisements and promotional segments that may include full-motion color commercials, stop-frame commercials, and other advertisements. Information such as trivia questions and famous quotations, for example, can be interspersed between the advertisements if desired. Once it is sensed that consumers are no longer present within the sensed proximity range, the idle mode is again activated for displaying the mode's associated non-advertisement information.

Additionally, the system 10 may comprise a sound generator 24. The sound generator 24 preferably generates an audio portion of the advertisements as they are being shown on the display 12. Optionally, the sound generator 24 may generate advertisements that are only audio, and may not accompany any video being shown or may generate audio related to a stop-frame commercial or related to non-advertisement information on the display 12 for generating any associated audio. In the preferred embodiment, the sound generator 24 comprises a commercially available printed circuit board that includes data processing circuitry, and is commonly referred to as a "sound card". The audio level generated by the sound card can be predetermined.

An MPEG graphics control and decoding unit 26 is coupled to the display 12 and to a microprocessor 27 of a computing device 28. The MPEG decoding unit 26 is coupled to the display 12 and microprocessor 27 for controlling information shown on the display 12. The MPEG decoding unit 26 performs MPEG data compression for transferring both video data and data status information. The MPEG decoding unit 26 enables the computing device 28 to be securely and efficiently utilized. The MPEG decoding unit 26 coacts with the sound generator 24 to produce desired sound effects, so that the sound effects can be optionally played with or without the video on the display 12.

The system 10 of the present invention is designed to determine the activation time period of the active mode and for determining the portions of the programmed sequence of advertisements that were displayed during the active mode in order to determine the particular advertisements that may have been viewed by the consumer. The system 10 is also designed to generate consumer tracking data representative of the time period that the active mode was invoked and what portions of the sequence of advertisements were displayed during the active mode and can operate to transmit the identification, viewer response and tracking data to a host computer (not shown). In this manner the system 10 forms part of a network of such systems disposed at discrete locations and inter-connected for uni-directional or bi-directional communication with one or more remote host computers. The communication between these devices can be effected through the internet, intranet, and/or wirelessly.

In the preferred embodiment, the system 10 includes the controller 28 coupled to the display 12 and to a sensing system 38 for detecting the presence, identity, response and behavior of potential consumers within a proximity range relative to the system 10, and particularly, relative to the display 12. The controller 28 of the preferred embodiment consists of a commercially available microprocessor based system that includes the microprocessor 27, a PCI data bus 32, temporary memory such as DRAM 33, data input and data output (I/O) support 34, and peripheral data processing-devices in a motherboard chipset 35 as is known.

One or more storage devices 36 are coupled to the controller 28 and are provided for storing the information displayed during the idle and active modes of the system 10. The storage devices 36 may also be utilized for storing the identity, viewer response and consumer tracking data prior to, or in lieu of, transmission of the data to the host computer. The storage devices 36 may comprise a known hard disk drive, such as one used in a portable computer, optical drive, or a solid state storage device, such as an EEPROM, FLASH EEPROM, or SRAM memory device array. Use of a CD ROM: in lieu of a hard disk drive in order to conserve unit space and minimize cost is also contemplated.

After the identity, viewer response and consumer tracking data is generated, the identity, viewer response and tracking data can be retrieved from the host computer or locally for determining what information in the active mode was displayed and the duration that the system 10 was in the active mode, for determining consumer presence and what portions of the active mode information may have been viewed by potential consumers. The identity, viewer response and tracking data can additionally be used for billing users of the invented system 10 and for compiling data bases for marketing and other purposes.

Thus, the identity, viewer response and tracking data provides information that indicates the level of interest and number of consumers that are present within the proximity range and viewing the display 12, along with the number of occurrences that particular advertisements were presented to potential consumers, since the location of each advertisement on the sequence is known. Therefore, the system of the present invention 10 provides the advertising industry a higher level of accountability than existed in the prior art.

The sensing system 38 may comprise any one of several commercially available proximity sensors 30, such as motion detectors or heat or optical sensors, or other sensors that are capable of detecting persons, or appropriate combinations of known sensors of the same or different types. Sensing system 38 may include ultrasound sensors operating in conjunction with complex detection devices 44 whose outputs are subject to prescribed pattern recognition algorithms. As an example, proximity sensors 30 may comprise ultrasound sensors having adjustable proximity range for improving system accuracy and detection range. Proximity sensors 30 operate to trigger the active mode of the system 10, which is recorded and analyzed, and also to trigger operation of complex detection devices 44 designed to identify consumers and recognize specific patterns such as a viewer's eyes or face direction. A plurality of ultrasound sensors may be used for improving the accuracy and detection range of the system. Ultrasound sensors (not shown) provide an adjustable proximity range. Those skilled in the art will recognize that any combination of operating procedures for the system 10 and the sensors 30 and detection devices 44 may be utilized without departure from the spirit and scope of the invention.

Complex detection devices shown generally at 44, that may include or comprise cameras, facial recognition or optical scanners, or combinations thereof, can be used for determining the identity and shape of a viewer within the proximity range and for determining if the viewer is facing the display 12, and/or to determine if the viewer is actually viewing information being shown by the display 12. For example, the complex detection devices 44 may include one or a combination of video cameras 45, digital cameras, facial recognition or optical scanners for identifying or recognizing the shape of viewers and/or their viewing direction within a viewing range of the cameras 45. A viewer's identity or intention can be determined by triggering sensor system 38 to locate two concentric circles spaced approximately 1 to 2 inches apart. Once the characteristics of the consumer facing the display 12 are detected, the sensor system 38 processes and stores detailed information relating to the identity or characteristics of the consumer for later analysis by the system 10 or host computer. This information may be used for billing and status information of the system 10 at a particular location, or for a number of different systems 10 placed at a number of different locations. Of course, the functions of sensors 30 and detection devices 44 may be integrated into a common device such that detection devices 44 may for example operate to sense the presence of a viewer and then proceed to analyze patterns related to the viewer which are indicative of his/her attentiveness to the system 10.

The system 10 further includes a communication device such as a modem 40 or other known data transmission means for connecting one or more systems comprising the present invention 10 to at least one host computer. A plurality of systems 10 comprising the present invention can be coupled to the host computer via known data transmission lines 42 and using known methods such as the Internet and an intranet as mentioned above. The communication device 40 may also be utilized to enable the system 10 to receive information, such as current weather reports and traffic reports for example, from the host computer or other data source coupled to the communication device. Of course data transmission is not confined to transmission lines 42 as the use of wireless communication between the systems 10 and the host computer is also contemplated by the invention.

Thus, the system of the present invention simultaneously identifies, measures and tracks the number of consumers viewing different advertisements, while displaying different selected advertisements for viewing by the consumer. The system functions in either one of the idle mode, wherein potential consumers are not within a sensed proximity range, and the active mode, wherein the presence of potential consumers within the proximity range is detected. In the idle mode, the system displays programmed non-advertisement information. In the active mode, the system displays a programmed sequence of advertisements that may include full-motion color commercials that may be interspersed with other information. The time period of the active mode is sensed for determining the portions of the programmed sequence of advertisements that were displayed during the active mode, for determining particular advertisements that may have been viewed by the consumer to generate consumer tracking data. The tracking data is retrieved from either the remote unit or a host computer for determining what information in the active mode was displayed and the duration that the system was in the active mode for determining consumer presence, identification and what portions of the active mode information may have been viewed by consumers.

Figure 4:
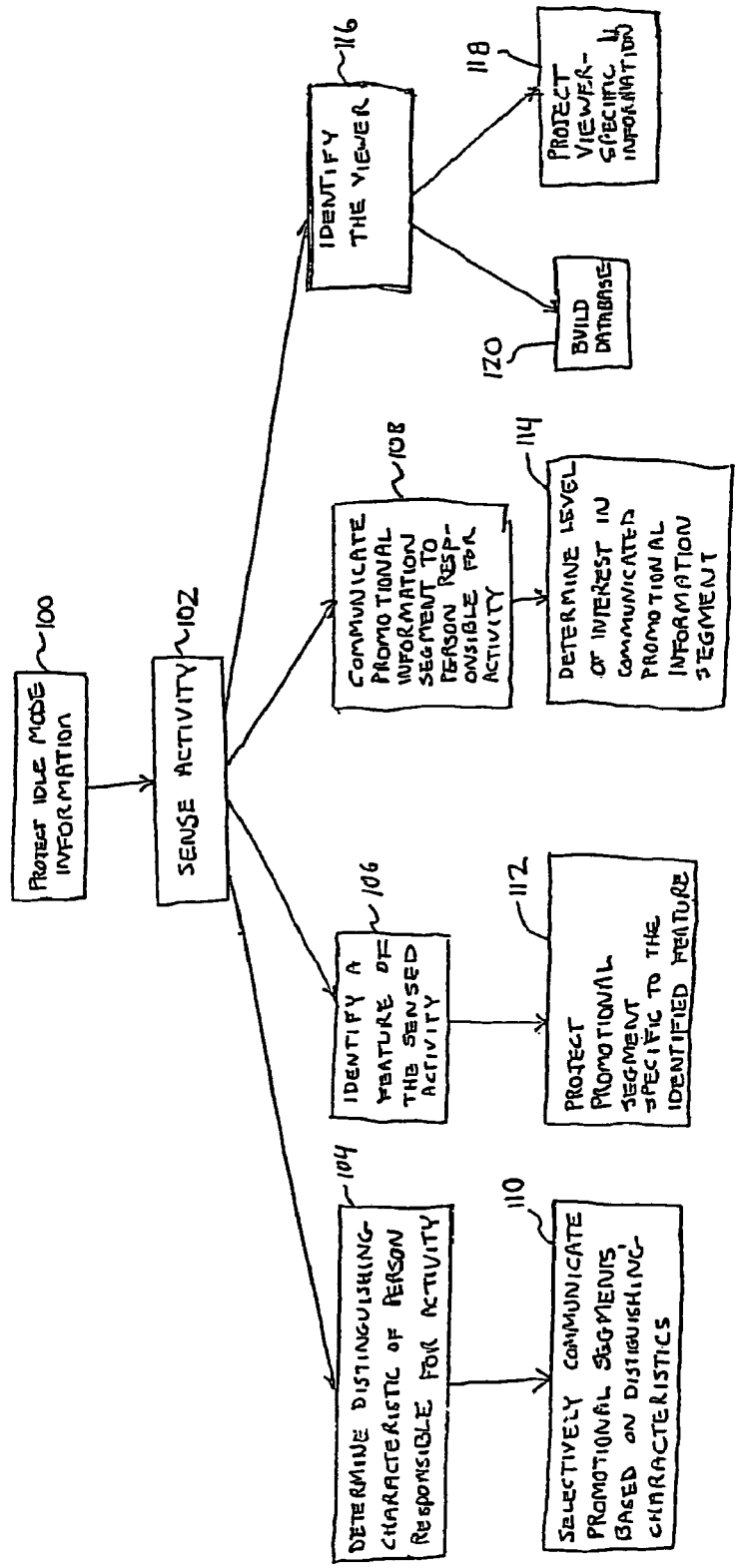
FIG. 4 is a diagrammatical representation of system operation in accordance with the invention.

Operation of the invention can be explained With reference to FIG. 4. In step 100, the system 10 is operating in idle mode, in which it is displayed for generally projecting programmed non-advertisement information such as trivia questions or other similar information, a picture of a missing person with an associated telephone number for contacting law enforcement officials, current weather reports or traffic reports or other real time information or updates uploaded from a remote location through the internet or wirelessly.

In Step 102 the system 10 senses an activity, such as the presence of a person in a detection zone of sensor system 38. In response to the activity sensing step 102, the system 10 then implements one or more of steps 104, 106, 108 and 116. Step 104 engenders the determining of a distinguishing characteristic of the person responsible for the sensed activity. Examples of distinguishing characteristics include, but are not limited to, gender, race, ethnic background, age, nationality, height, weight and shape of the person. Known computational and pattern recognition algorithms can be applied to make these determinations from optical images or other sensed information detected by sensing system 38 and operating in conjunction with controller 28. The determination of the distinguishing characteristic or characteristics effected in Step 104 can be followed by the generation of data reflecting the types of viewers who have taken an interest in the communicated promotional information, for purposes of accountability to participating advertisers, for instance. The information derived from Step 104 can also be used to develop a demographics profile for marketing or other purposes, using either system 10 or a remote system to which the information is downloaded. The information from Step 104 can also be used as indicated in Step 110, to selectively communicate promotional segments based on the distinguishing characteristic of the person responsible for the sensed activity. In other words, the information can be used to target a specific demographics group for a particular product or service. One example can be promoting sports cars to young males. Step 102 can also be followed by Step 106, wherein a feature of the sensed activity is identified. The feature can be the location of the sensed activity. This is useful for example when the system 10 is disposed at least partially in a moving public vehicle, such as a transit bus, with the location of the bus at the time the activity is sensed being determined, for example, using known GPS (Global Positioning System) expedients. One use of this would be to promote products or services whose vendors are in the region of the bus at the time the activity is sensed, and even to offer for sale through the system 10 these products or services. The step of projecting promotional segments specific to the identified feature of the activity is designated Step 112.

Step 102 can also be succeeded by Step 108, in which promotional information can be communicated to the person responsible for the sensed activity, and then followed by Step 114, which entails determining the level of interest in the communicated promotional information. Such information is useful in marketing research and can be determined by analyzing the length of time that the viewer is viewing display means 12 or a portion thereof, or the quantity or quality of input received from the viewer by the system, if the system is equipped to make such a determination by, for example, being designed to be interactive with the viewer through the use of a keyboard or speech recognition expedients. It is also possible for Step 102 to be followed by Step 116 in which the viewer is identified as a specific individual by the system 10 based on visual or audible sensing of features of the viewer and on previous sessions and with recourse to data compiled from previous purchasing behavior or other financial profiles and information about the viewer. Viewer identification indicated in Step 116 can be followed by Step 118 in which viewer-specific information is projected, and/or Step 120, in which a data base is built (or an existing data base augmented) about the viewer for subsequent targeting and/or correlation with subsequent purchases by the viewer through the matching of credit card information, for example.

The above are exemplary modes of carrying out the invention and are not intended to be limiting. It will be apparent to those skilled in the art that modifications thereto can be made without departure from the spirit and scope of the invention as set forth in the following claims.

The invention claimed is:

1. A system for selectively communicating promotional information to a person, comprising:
   a sensing system for sensing the presence of a person at a predetermined location and for measuring detectable features associated with the person;
   a storage device for storing a plurality of promotional segments;
   a controller, comprising a processor, for determining, based on said measured detectable features, distinguishing characteristics of the person sensed by the sensing system and, based on said distinguishing characteristics, for selecting at least one of said stored promotional segments for projection; and
   a projection device for projecting to the person at the predetermined location said selected promotional segment;
   wherein the distinguishing characteristics consist of at least any two of, but not all of, gender, race, ethnic background, age, nationality, height, and weight of the person.

2. The system of claim 1, wherein the controller further determines the person's interest in the projected promotional segment by measuring detectable features associated with the person.

3. The system of claim 2, wherein said projection device comprises an electronic display for communicating the promotional information.

4. The system of claim 3, wherein the controller determines the person's interest by determining any of whether the person is looking in the direction of the electronic display, the duration that the person is looking in the direction of the electronic display, by measuring changes in the person's eye pupil size, and by analyzing eye movement of the person.

5. The system of claim 2, wherein said projection device projects promotional information based on the determined interest.

6. The system of claim 1, wherein the system is in communication with a remote host computer.

7. The system of claim 6, wherein the host computer is in communication with a vendor of a service or product which is the subject of the projected promotional information, the controller further operating to afford the person the opportunity to effect a purchase or order of said service or product.

8. The system of claim 1, wherein the controller determines distinguishing characteristics by accessing pre-stored information about the person.

9. The system of claim 8, wherein the pre-stored information is conveyed via a data link from a remote location to the location from which the promotional information projected.

10. The system of claim 1, wherein one or more of said characteristics are determined by any of facial scanning, an optical detector effecting a retinal or iris scan, an optical detector effecting a retinal and iris scan, and voiceprint analysis.

11. The system of claim 1, wherein the sensing system senses entry of the person into a detection zone.

12. The system of claim 1, wherein the sensing system senses activity of a device operated by the person.

13. The system of claim 1, said controller is configured to cause the identity of said promotional information, and said distinguishing characteristics to be stored on said storage device.

14. The system of claim 1, said controller is configured to cause the identity of said promotional information, and said distinguishing characteristics to be transmitted to a remote receiver.

15. A system for selectively communicating promotional information to a person, comprising:
  a sensing system for sensing the presence of a person at a predetermined location and for measuring detectable features associated with the person;
  a storage device for storing a plurality of promotional segments;
  a controller for:
    determining distinguishing characteristics of the person using said detectable features measured by said sensing system, said distinguishing characteristics consisting of at least any two of, but not all of, gender, race, ethnic background, age, nationality, height, and weight of the person; and
    selecting for display to the person at the predetermined location at least one of said plurality of stored promotional segments using said determined distinguishing characteristics, said selected promotional segment containing information tailored for persons with said determined distinguishing characteristics.

16. A system for selectively communicating promotional information to a person, comprising:
  a sensing system for sensing the presence of a person at a predetermined location and for measuring detectable features associated with the person;
  a storage device for storing a plurality of promotional segments;
  a controller for:
    determining distinguishing characteristics of the person using said detectable features measured by said sensing system, said distinguishing characteristics consisting of at least any two of, but not all of, gender, race, ethnic background, age, nationality, height, and weight of the person, wherein one or more of said characteristics are determined by any of facial scanning, an optical detector effecting a retinal or iris scan, an optical detector effecting a retinal and iris scan, and voiceprint analysis;
    determining the person's interest by determining any of whether the person is looking in the direction of the electronic display, the duration that the person is looking in the direction of the electronic display, by measuring changes in the person's eye pupil size, and by analyzing eye movement of the person; and
    selecting for display to the person at the predetermined location at least one of said plurality of stored promotional segments, based upon said person's determined interest, and using said determined distinguishing characteristics, said selected promotional segment containing information tailored for persons with said determined distinguishing characteristics.

17. A computer implemented method for selectively communicating promotional information to a person, comprising the steps of:
  sensing the presence of a person at a predetermined location with a sensing system and measuring detectable features associated with the person;
  storing a plurality of promotional segments;
  providing a controller configured for determining distinguishing characteristics of the person using said detectable features measured by said sensing system, said distinguishing characteristics consisting of at least any two of, but not all of, gender, race, ethnic background, age, nationality, height, and weight of the person; and
  said controller configured for selecting for display to the person at the predetermined location at least one of said plurality of stored promotional segments using said determined distinguishing characteristics, said selected promotional segment containing information tailored for persons with said determined distinguishing characteristics.

18. A computer implemented method for selectively communicating promotional information to a person, comprising the steps of:
  sensing the presence of a person at a predetermined location with a sensor system and measuring detectable features associated with the person;
  storing a plurality of promotional segments;
  providing a controller configured for determining distinguishing characteristics of the person using said detectable features measured by said sensing system, said distinguishing characteristics consisting of at least any two of, but not all of, gender, race, ethnic background, age, nationality, height, and weight of the person, wherein one or more of said characteristics are determined by any of facial scanning, an optical detector effecting a retinal or iris scan, an optical detector effecting a retinal and iris scan, and voiceprint analysis;
  said controller configured for determining the person's interest by determining any of whether the person is looking in the direction of the electronic display, the duration that the person is looking in the direction of the electronic display, by measuring changes in the person's eye pupil size, and by analyzing eye movement of the person; and
  said controller configured for selecting for display to the person at the predetermined location at least one of said plurality of stored promotional segments, based upon said person's determined interest, and using said determined distinguishing characteristics, said selected promotional segment containing information tailored for persons with said determined distinguishing characteristics.

* * * * *